(No Model.)
W. T. SEARS.
HEATER FOR CARS, ROOMS, &c.
No. 340,826. Patented Apr. 27, 1886.
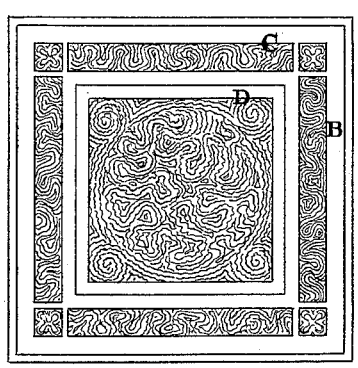
1
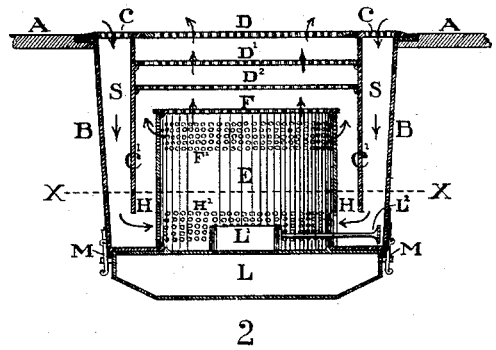
2
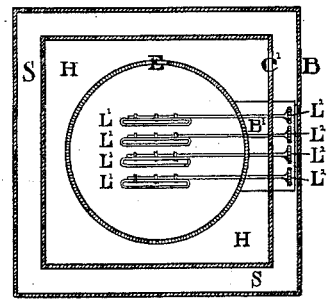
3
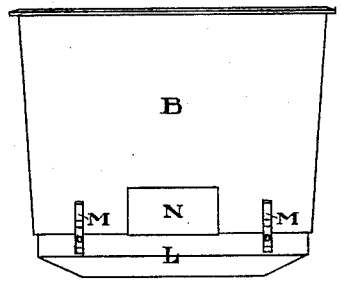
4
Witnesses:
Chas H Cummings
George A. Moore
Inventor.
Willard T. Sears

UNITED STATES PATENT OFFICE.

WILLARD T. SEARS, OF BOSTON, MASSACHUSETTS.

HEATER FOR CARS, ROOMS, &c.

SPECIFICATION forming part of Letters Patent No. 340,826, dated April 27, 1886.

Application filed February 20, 1885. Serial No. 156,576. (No model.)

*To all whom it may concern:*

Be it known that I, WILLARD T. SEARS, of Boston, in the county of Suffolk and State of Massachusetts, have invented a new and useful Improvement in Heaters for Cars, Rooms, &c., of which the following, taken in connection with the accompanying drawings, is a specification.

My invention has for its object the construction of an oil or gas stove in such a manner that it may be portable and adapted for use in rooms, cars, vehicles, &c. I attain this object by the mechanism shown in the accompanying drawings, in which—

Figure 1 is a plan of my invention as it appears when applied to the floor of a room, car, or vehicle. Fig. 2 is a cross-vertical section of the same. Fig. 3 is a horizontal section taken on line X X of Fig. 2. Fig. 4 is a side elevation of the same.

In Fig. 2, A represents the floor of the room, car, or vehicle to which my improved stove is applied; B, a casing of metal, made as shown, and adapted to fit an opening made in the floor of the room, car, or vehicle. To the bottom of the case B, I attach the lamp or oil-reservoir L. This lamp is represented as having four burners, L' L' L' L', as shown at Fig. 3.

C C' C C', Fig. 2, is an inner casing of metal, that, in connection with the outer casing, B, forms an air-space, S, through which air descends from the room, car, or vehicle, as indicated by the arrows.

D D' D'' are grills, which can be taken out at pleasure.

The fire-chamber of the stove is shown at E, Figs. 2 and 3, and is provided at its bottom with perforations H', through which some of the air that descends through the space S may pass, furnishing air to the lamps, and after becoming heated, flows through the openings F' F, thence upward through the grills D'' D' D to the interior of the room, car, or vehicle. The ascending air in its passage through the space H is heated by radiation from the fire-chamber E.

The lamp or oil-reservoir L is held to the part B by hasps M M, Figs. 2 and 4.

All of the parts of my apparatus are detachable one from the other, and the whole is portable, thus the parts C C' D D' D'' may be removed one at a time or all together. Then the fire-chamber F E of the stove proper may be removed, and all of the parts thoroughly cleaned or repaired. If thought desirable, bails or handles may be connected to the several parts, although this is not necessary, as the parts may be easily handled by placing the fingers in the perforations in the grills.

Instead of the oil-stove E L, a gas-stove may be used.

The characteristic feature of my invention is so making the stove or heater that it can be readily removed from the room, car, or vehicle, replenished, and returned.

B', Fig. 3, represents an aperture made in the bottom of the case B, to admit of the passage of the stems of the wick-raisers when the lamps are detached.

N, Fig. 4, is a small door made in the outer case, B, and serve to admit the hand of the attendant, for the purpose of adjusting the wick-raisers $L^2 L^2 L^2 L^2$.

I claim—

In an oil or gas stove or heater for a room, car, or vehicle, the combination of the outer case, B, adapted to fit into the floor and to receive a grill, D. and the inner case, C C C' C', having grills D' D', with the stove E L, all operating together substantially as described, and for the purpose set forth.

WILLARD T. SEARS.

Witnesses:
CHAS. A. CUMMINGS,
GEORGE A. MOORE.